US009576413B2

(12) United States Patent
Kamisawa et al.

(10) Patent No.: US 9,576,413 B2
(45) Date of Patent: Feb. 21, 2017

(54) PORTABLE MACHINE AND CONTROL SYSTEM

(71) Applicants: Kazunobu Kamisawa, Tochigi (JP); Yosuke Tomita, Aichi (JP)

(72) Inventors: Kazunobu Kamisawa, Tochigi (JP); Yosuke Tomita, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 0 days.

(21) Appl. No.: 14/645,662

(22) Filed: Mar. 12, 2015

(65) Prior Publication Data

US 2015/0261304 A1 Sep. 17, 2015

(30) Foreign Application Priority Data

Mar. 12, 2014 (JP) ................................ 2014-049475

(51) Int. Cl.

| | |
|---|---|
| ***G06F 3/01*** | (2006.01) |
| ***G07C 9/00*** | (2006.01) |
| ***E05F 15/73*** | (2015.01) |
| ***E05F 15/77*** | (2015.01) |

(52) U.S. Cl.

CPC ........... *G07C 9/00174* (2013.01); *E05F 15/77* (2015.01); *G07C 9/00563* (2013.01); *E05Y 2400/85* (2013.01); *E05Y 2900/531* (2013.01)

(58) Field of Classification Search

CPC E05F 15/77; E05Y 2400/85; E05Y 2900/531; G07C 9/00174; G07C 9/00563

USPC ........................ 340/5.1, 5.2, 5.32, 5.51, 5.28

See application file for complete search history.

(56) References Cited

U.S. PATENT DOCUMENTS

| | | | | |
|---|---|---|---|---|
| 7,650,623 | B2 * | 1/2010 | Hudgeons | G06Q 30/02 725/105 |
| 2005/0023118 | A1 * | 2/2005 | Dunfield | G04G 15/003 200/200 |
| 2009/0167524 | A1 * | 7/2009 | Chesnutt | G08C 17/02 340/539.19 |
| 2011/0248820 | A1 | 10/2011 | Gehin | |

FOREIGN PATENT DOCUMENTS

| | | |
|---|---|---|
| JP | 2009-030256 A | 2/2009 |
| JP | 2010-216182 A | 9/2010 |
| JP | 2011-226222 A | 11/2011 |

(Continued)

*Primary Examiner* — Yong Hang Jiang
(74) *Attorney, Agent, or Firm* — Osha Liang LLP

(57) ABSTRACT

A portable machine of the disclosure includes: a manipulation unit configured to receive a manipulation for a vehicle; a transmitter configured to transmit a function enabling signal to a control device based on the manipulation of the manipulation unit, the control device being configured to control opening and closing of an opening and closing body of the vehicle; and a display configured to display information. The display displays a remaining time of a predetermined time after the transmitter transmits the function enabling signal. The control device controls an opening operation of the opening and closing body based on user's action that is detected by a sensor within the predetermined time after the function enabling signal is received, the sensor being provided in or around the opening and closing body to detect the user's action.

9 Claims, 8 Drawing Sheets

(56) References Cited

FOREIGN PATENT DOCUMENTS

| | | | |
|---|---|---|---|
| JP | 2012-504716 | A | 2/2012 |
| JP | 2013-007171 | A | 1/2013 |
| JP | 2013-117134 | A | 6/2013 |

* cited by examiner

Gesture entry permission switch is manipulated three times
30
Lock
Unlock
Gesture
20'

Gesture entry permission switch is manipulated twice
20
Lock
Unlock
Gesture
20'

Gesture entry permission switch is manipulated once
10
Lock
Unlock
Gesture
20'
Remaining time display
Gesture entry permission switch Time setting screen Remaining time display screen

PORTABLE MACHINE AND CONTROL SYSTEM

CROSS-REFERENCE TO RELATED APPLICATION

This application is based on Japanese Patent Application No. 2014-049475 filed with the Japan Patent Office on Mar. 12, 2014, the entire contents of which are incorporated herein by reference.

FIELD

The disclosure relates to a portable machine used to manipulate a vehicle and a control system provided with the portable machine and an in-vehicle control device. More particularly, the disclosure relates to a portable machine and a control system for controlling an opening and closing body such as a vehicle door.

BACKGROUND

Conventionally, there is well known wireless communication conducted between a control device of a vehicle and a portable machine locking or unlocking the vehicle or a control system that detects user's action (gesture) to control the unlocking. For example, Unexamined Japanese Patent Publication No. 2011-226222 discloses an in-vehicle instrument automatic control system in which an undesirable activation of an in-vehicle instrument is prevented to cut the power consumption. The automatic control system includes a portable machine that can be brought with a user, an in-vehicle unit that is mounted on the vehicle to be able to conduct communication with the portable machine, and a controller that controls an operation of the in-vehicle instrument mounted on the vehicle based on a communication result between the in-vehicle unit and the portable machine. The portable machine includes a button that issues a command to the in-vehicle unit to lock or unlock a door when a user is away from the vehicle. When the button is pressed, a command signal including an identification number is transmitted, and the in-vehicle unit receives the command signal. The controller permits performance of the locking or unlocking command when successfully authenticating the identification number included in the command signal.

Unexamined Japanese Patent Publication No. 2010-216182 discloses an electric motor-driven type door unlocking device in order to avoid a vehicle door from being undesirably unlocked by a contact of a human body with an unlock sensor or proximity of the human body to the unlock sensor during vehicle wash in which the door needs not to be unlocked. In the electric motor-driven type door unlocking device, when a selection signal is input from a selection unit that outputs the selection signal by a manipulation of the vehicle user, an electric motor-driven type unlocking power generation unit is activated according to unlocking intention detection of a push button while the unlocking intention detection performed by the unlock sensor is disabled. The push button detects the unlocking intention of the vehicle user according to a pressing manipulation performed by the vehicle user.

Unexamined Japanese Patent Publication No. 2009-030256 discloses a vehicle electric motor-driven opening and closing door device in which the operation is ensured to improve user-friendliness. The vehicle electric motor-driven opening and closing door device does not electrically opens and close the door while the user is not authenticated even when a contact detection unit issues a contact signal, but always waits for the user authentication. Therefore, when the user comes close to an area where the authentication can be performed, the user authentication is completed and the door can be opened and closed.

Unexamined Japanese Patent Publication No. 2013-007171 discloses a vehicle door automatic opening and closing device that can improve comfort for the user while cost increase is restrained. In the vehicle door automatic opening and closing device, an obstacle existing on an opening and closing locus of a swing door is successively detected by a laser radar, a predetermined gesture of the user is detected within a scanning range of a searching wave, and the opening and closing of the swing door or other vehicle doors are automatically started based on a detection result of the gesture.

International Patent Publication No. 2012-504716 also discloses an automatic unlocking device of a vehicle opening and closing panel. The automatic unlocking device optically recognizes predetermined action (gesture) of a part of a human body from a distant place, and an openable and closable panel in front of a place where the action is performed is locked or unlocked in the case that the action is recognized to be the action of a registrant. The action is recognized when a portable identification member is located within a predetermined surrounding range of the vehicle.

Unexamined Japanese Patent Publication No. 2013-117134 discloses an opening and closing control system of a rear opening and closing body that can control an opening operation of the rear opening and closing body without false detection while cost is reduced using an existing system. In the opening and closing control system, a detected body is arranged at a position that can visually be recognized by a camera while the rear opening and closing body is closed, the camera is controlled in receiving a signal transmitted from the portable machine, whether the opening operation of the rear opening and closing body is performed is determined based on an image of the position of the detected body imaged by the camera, and the opening operation is controlled.

SUMMARY

One or more embodiments of the disclosure provide a portable machine, in which an owner of a portable machine or a passenger of the vehicle can use a function (a gesture entry function) of opening or closing the vehicle door by detecting the action such as a body or hand language signal only for a predetermined time after the function is enabled in order to prevent the false detection of the gesture to cut the power consumption of the vehicle and user-friendliness of the gesture entry function is improved by displaying a remaining time of the predetermined time for which the gesture entry function can be used.

According to one or more embodiments of the disclosure, a portable machine includes: a manipulation unit configured to receive a manipulation for a vehicle; a transmitter configured to transmit a function enabling signal to a control device based on the manipulation of the manipulation unit, the control device being configured to control opening and closing of an opening and closing body of the vehicle; and a display configured to display information. At this point, the display displays a remaining time of a predetermined time after the transmitter transmits the function enabling signal, and the control device controls an opening operation of the opening and closing body based on user's action that is detected by a sensor within the predetermined time after the function enabling signal is received, the sensor being provided in or around the opening and closing body to detect the user's action.

The owner of the portable machine enables the gesture entry function only for the predetermined time by owner's choice, so that the false detection of the action can be prevented during the disabled function to cut power consumption of the vehicle. Because the portable machine displays the remaining time of the predetermined time for which the gesture entry function is enabled, the owner can easily understand whether the gesture entry function is enabled, the owner or the desired passenger can surely perform the action within the predetermined time, and the portable machine in which the convenience of the gesture entry function is improved can be provided.

The portable machine further includes a receiver configured to receive a function enabling notification signal from the control device, the function enabling notification signal making a notification that a function is enabled by the function enabling signal. At this point, the display may display the remaining time after the function enabling notification signal is received.

It is conceivable that sometimes the vehicle side does not receive the function enabling signal even if the portable machine transmits the function enabling signal. Therefore, a false impression given to the user due to the display of the remaining time can be avoided in such cases.

In the portable machine, the display may display a message that the function is not enabled when the function enabling notification signal is not received within the predetermined time after the function enabling signal is transmitted.

In the case that the vehicle side does not receive the function enabling signal even if the portable machine transmits the function enabling signal, the user can be notified that the vehicle side does not receive the function enabling signal by displaying the message.

In the portable machine, the portable machine may be provided with a plurality of portable machines including a first portable machine configured to transmit the function enabling signal and a second portable machine including a display configured to display the remaining time.

Therefore, a presentation having a rich expressive power can be performed by displaying the remaining time in the second portable machine having an extensive display function.

In the portable machine, the predetermined time may be variable.

Accordingly, because various predetermined times can be set according to the situation, and the user-friendliness is improved.

According to one or more embodiments of the disclosure, an opening and closing body control system includes: an opening and closing body of a vehicle; a control device configured to control opening and closing of the opening and closing body; a portable machine configured to transmit a function enabling signal to the control device based on a manipulation; and a sensor provided in or around the opening and closing body to detect user's action. At this point, the portable machine displays a remaining time of a predetermined time after the function enabling signal is transmitted, and the control device controls an opening operation of the opening and closing body based on user's action that is detected by the sensor within the predetermined time after the function enabling signal is received.

The owner of the portable machine enables the gesture entry function only for the predetermined time by owner's choice, so that the false detection of the action can be prevented during the disabled function to cut power consumption of the vehicle. Because the portable machine displays the remaining time of the predetermined time for which the gesture entry function is enabled, the owner can easily understand whether the gesture entry function is enabled, the owner or the desired passenger can surely perform the action within the predetermined time, and the control system in which the convenience of the gesture entry function is improved can be provided.

In the opening and closing control system, the control device may perform the opening operation after unlocking, when the control device controls the opening operation while the opening and closing body is locked.

Therefore, even if the opening and closing body is locked, the opening operation of the opening and closing body can be performed by one manipulation, and the convenience is improved.

As described above, one or more embodiments of the disclosure can provide the portable machine, in which the owner of the portable machine or the passenger of the vehicle can use the function (the gesture entry function) of opening or closing the vehicle door by detecting the action such as the body or hand language signal only for a predetermined time after the function is enabled in order to prevent the false detection of the gesture to cut the power consumption of the vehicle and the user-friendliness of the gesture entry function is improved by displaying the remaining time of the predetermined time for which the gesture entry function can be used.

DETAILED DESCRIPTION

Hereinafter, embodiments of the present disclosure will be described with reference to the drawings. In embodiments of the disclosure, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A specific usage scene of a first embodiment will be described below. Conventionally, for example, in the case that a driver wants to get a passenger on a vehicle earlier than the driver gets on the vehicle, the driver takes a lot of trouble such that the drive hands a portable machine over to the passenger, or such that the driver manipulates the portable machine according to passenger boarding timing. Particularly, in the case that the driver has luggage, the driver takes a trouble of laying down the luggage in order to take out the portable machine. In the first embodiment, when the portable machine is previously manipulated to enable a gesture entry function, it is not necessary for the driver to hand the portable machine over to the passenger, and it is not necessary to manipulate the portable machine according to the passenger boarding timing.

It is assumed that the user gets out of the vehicle to go shopping at a shopping mall, and then the user heads down to the vehicle with the luggage. When the gesture entry function is enabled by the manipulation of the portable machine while the luggage is laid down at an entrance of the shopping mall, an opening and closing body such as a slide door and a trunk can be opened by performing action (gesture) at a time point the driver reaches the vehicle, but it is not necessary for the driver to lay down the luggage to manipulate a door handle. Particularly, it is convenient that the opening and closing body can smoothly be opened when it is raining.

Figure 1:
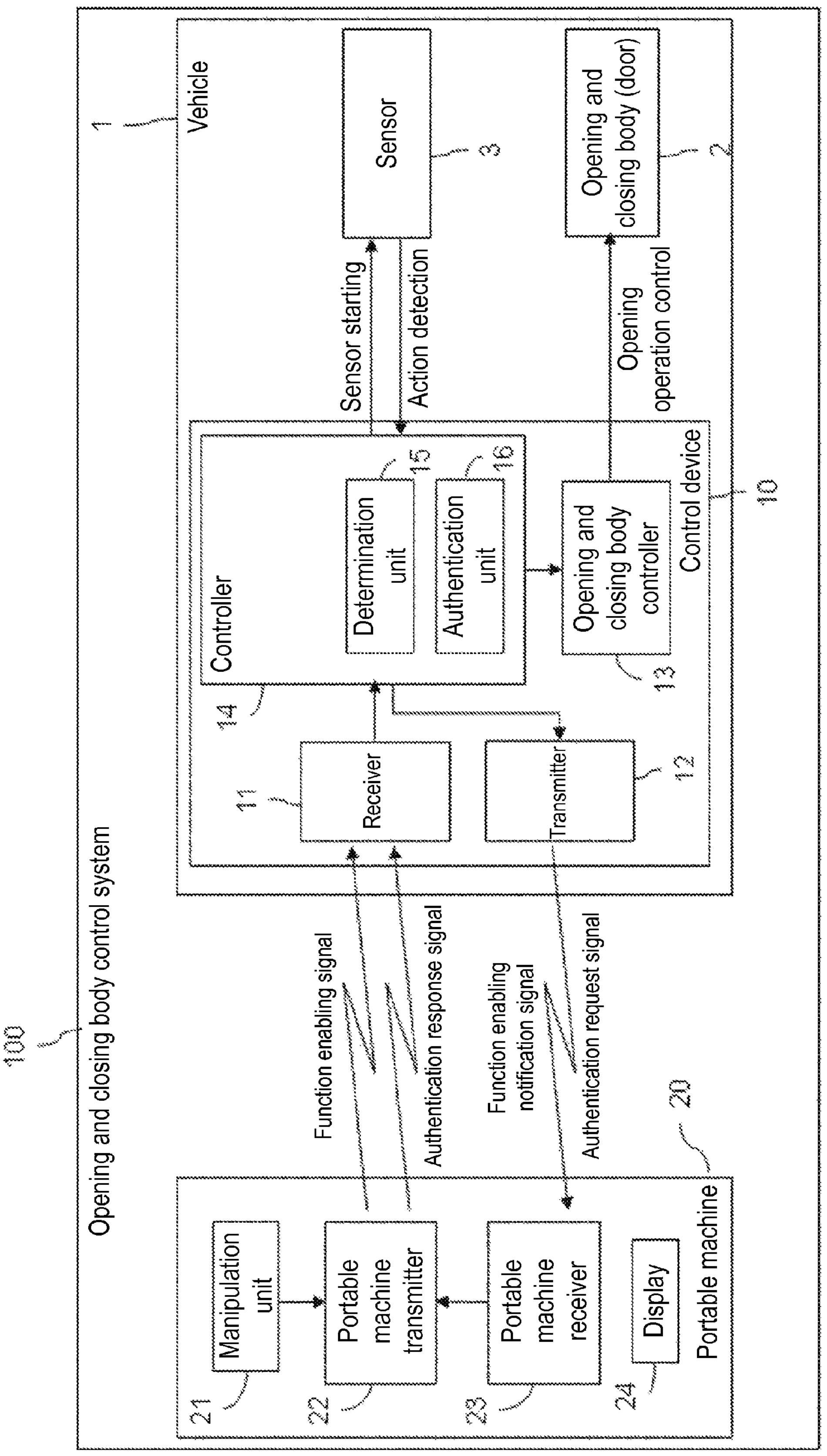
FIG. 1 is a block diagram illustrating an opening and closing body control system according to a first embodiment of the disclosure.
Figure 2:
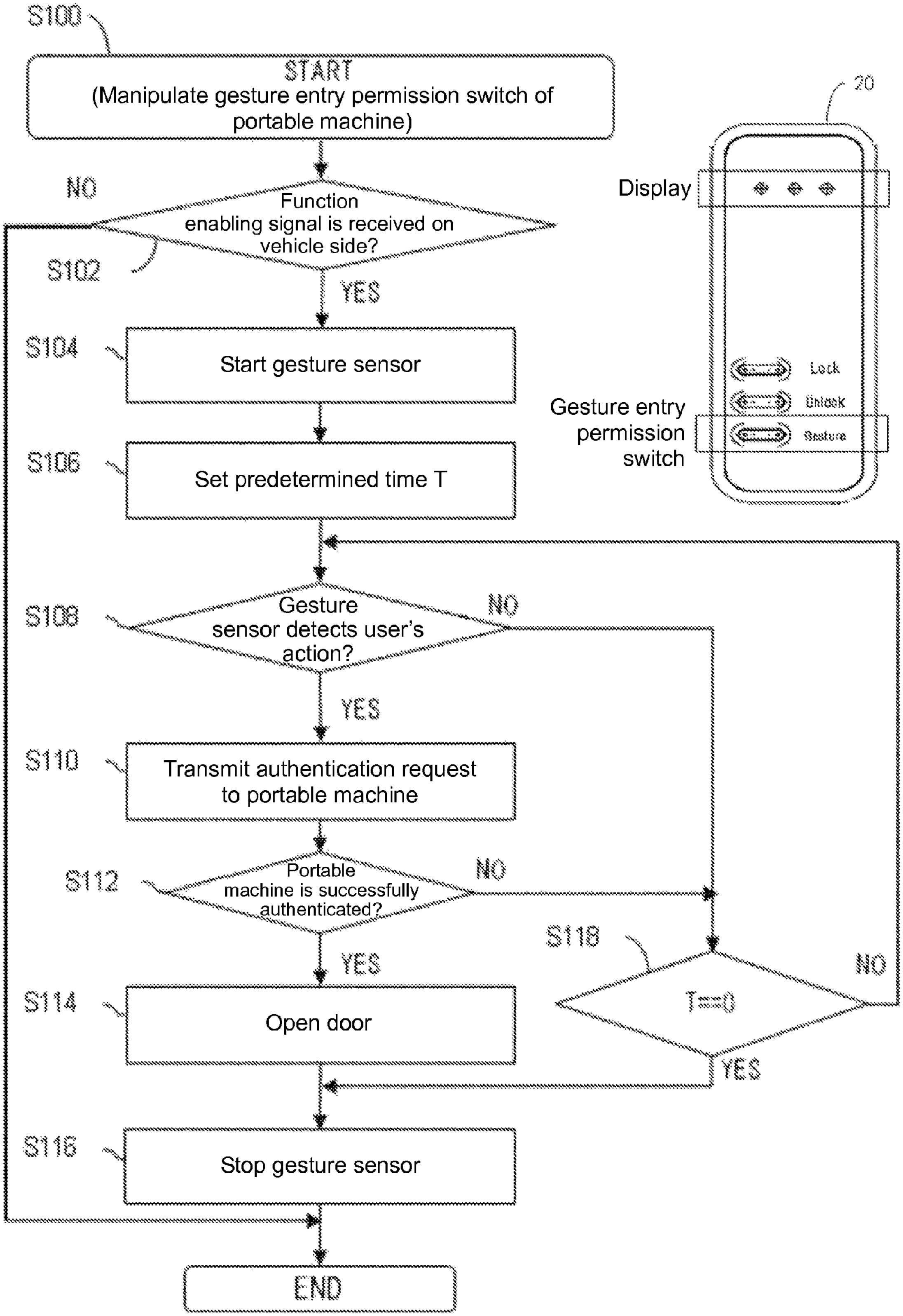
FIG. 2 is a flowchart illustrating a control step in an opening and closing body control device of the first embodiment and a front view of a portable machine.
Figure 3:
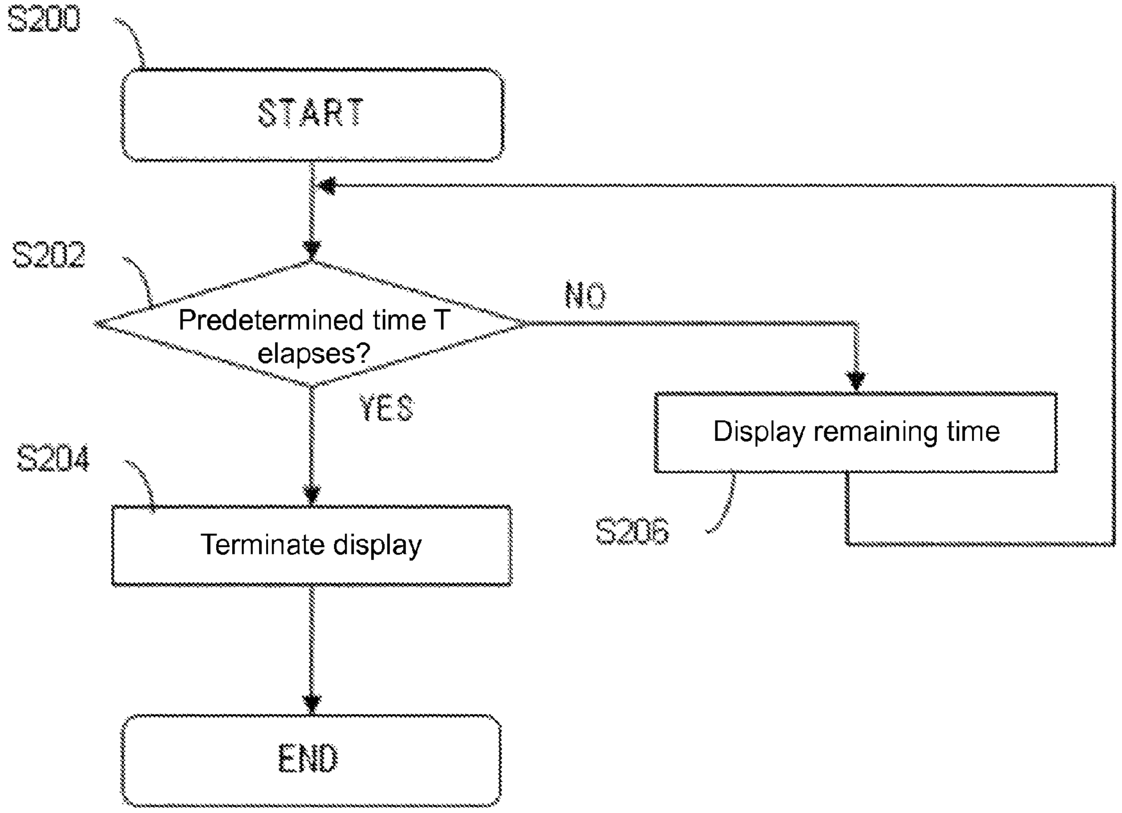
FIG. 3 is a flowchart illustrating a display step in the portable machine of the first embodiment.

An opening and closing body control system 100 of the first embodiment will be described with reference to FIGS. 1 to 3. The opening and closing body control system 100 includes an opening and closing body 2 that is provided in a vehicle 1, a sensor 3 that detects a user's action, and a control device 10 that controls opening and closing of the opening and closing body 2. The opening and closing body control system 100 also includes a portable machine 20. The portable machine 20 is carried by the user of the vehicle 1, and receives the manipulation from the user of the vehicle 1 to conduct wireless communication with the control device 10.

The opening and closing body 2 may be not only the door (including the slide door) of the vehicle 1 through which a person gets in or out of but also a door or a tailgate and a trunk through which the luggage is taken in and out. Any sensor is used as the sensor 3 as long as the sensor can detect the action (gesture) such as a body or hand language signal within a gesture detection range. For example, an optical system imaging sensor such as a CCD camera, a laser radar that catches a target by beam scanning, and an infrared sensor or a proximity sensor may be used as the sensor 3. The sensor 3 is provided in the opening and closing body 2 or a neighborhood of the opening and closing body 2 to detect the action of the person existing on a lateral or rear side of the vehicle 1.

The gesture detection range is previously set to an optimum range as appropriate, because the user's action can hardly be detected when the gesture detection range is set to an excessively narrow range, or because false detection or a security problem occurs when the gesture detection range is set to an excessively wide range. Predetermined action to be detected is defined, and a predetermined operation of the vehicle may be performed when the predetermined action is detected. As used herein, for example, the predetermined operation means an unlock operation of the opening and closing body or door. Even if the user's hands are filled of the luggage, the sensor 3 detects the action of a foot and the like of the user, which allows the user to open the opening and closing body 2 such as the door or trunk of the vehicle 1 without using his/her hand.

The control device 10 includes a receiver 11 that receives a wireless signal from the portable machine 20, a transmitter 12 that transmits the wireless signal to the portable machine 20, an opening and closing body controller 13 that opens and closes the opening and closing body 2 of the vehicle 1, and a controller 14 that controls the transmission and reception to and from the portable machine 20, the opening and closing body controller 13, and the sensor 3. The receiver 11 receives a function enabling signal that is transmitted from the portable machine 20 manipulating the vehicle 1. The portable machine 20 includes a portable machine receiver 23 that receives the signal from the transmitter 12 of the vehicle 1, a portable machine transmitter 22 that transmits the function enabling signal to the receiver 11 of the vehicle 1, a manipulation unit 21 that receives a user's manipulation, and a display 24 that displays information.

In the portable machine 20, when the manipulation unit 21 receives the user's manipulation, the portable machine transmitter 22 transmits the function enabling signal that starts the sensor 3 of the vehicle 1 to enable the gesture detection function.

There is no particular limitation to a kind and the number of the manipulation units 21 of the portable machine 20 as long as the manipulation unit 21 is a switch, such as a push button, which receives the user's manipulation. For example, as described later, the manipulation unit 21 may be a dedicated switch that enables the sensor 3, or a switch that is also used in other functions.

In the case that the manipulation unit 21 is the dedicated switch that enables the sensor 3, the portable machine includes a enabling manipulation unit that transmits the function enabling signal. Therefore, because the function enabling signal is transmitted from the portable machine only by the user's manipulation, the function enabling signal can be transmitted under a confirmation of a user's intention, and an undesirable opening operation can be prevented. In the case that the enabling manipulation unit is also used in other functions, the manipulation unit becomes common to a manipulation unit that transmits another signal. Therefore, a user-friendly portable machine can be provided by providing a manipulation unit in common with, for example, an unlocking manipulation unit and a manipulation unit that remotely starts an engine.

The manipulation unit 21 has a function of setting predetermined time for which the gesture detection function becomes valid. The predetermined time are timed by the control device 10 on the side of the vehicle 1 and the portable machine 20 itself. The manipulation unit 21 may include a dedicated switch that sets the predetermined time, or the manipulation unit that transmits the function enabling signal may also be used to set the predetermined time. For example, the predetermined time may be transmitted to the side of the vehicle 1 depending on the number of manipulation times of the manipulation unit 21 at the same time as the predetermined time is set, or the function enabling signal may be transmitted for a short press of the manipulation unit 21 while the predetermined time is set for a long press of the manipulation unit 21. Thus, the user changes the predetermined time for which the gesture detection function is valid to be able to set various predetermined times according to a situation, so that convenience is further improved.

The display 24 displays remaining time of the predetermined time after the portable machine transmitter 22 transmits the function enabling signal. For example, in the case that the user sets the predetermined time for which the gesture detection function is valid to 30 seconds, the portable machine 20 may store predetermined time setting information in a storage (not illustrated) of the portable machine 20 while transmitting the predetermined time setting information from the portable machine transmitter 22 to the control device 10 of the vehicle 1. The portable machine 20 displays a value, in which elapsed time is subtracted from 30 seconds since the user manipulates the manipulation unit 21 to transmit the function enabling signal, on the display 24. The user or passenger learns the remaining time, which is displayed on the display 24 to be able to perform gesture entry, after enabling the sensor 3 at a place distant from the vehicle 1. Therefore, the user or passenger can reach the gesture detection range in time to perform the action.

The controller 14 on the side of the vehicle 1 includes a determination unit 15. The determination unit 15 transmits and receives the information to and from the portable machine 20, controls the opening and closing body controller 13 and the sensor 3, and measures the predetermined time since the receiver 11 receives the function enabling signal to determine whether the predetermined time elapses. When receiving the function enabling signal or predetermined time setting information from the portable machine 20, the receiver 11 transmits the reception of the function enabling signal or predetermined time setting information to the controller 14. When receiving the transmission of the predetermined time setting information from the receiver 11, the controller 14 stores the predetermined time setting information in the storage (not illustrated), and the determination unit 15 measures the timing based on the predetermined time setting information. When receiving the transmission of the function enabling signal from the receiver 11, the controller 14 starts the sensor 3 such that the sensor 3 is put into a state enabling the gesture detection. The sensor 3 can detect the action only during a period until the determination unit 15 determines that the predetermined time elapses to stop the sensor 3 since the sensor 3 is put into a state enabling the gesture detection. The predetermined time measured by the portable machine 20 or determination unit 15 defines the time for which the sensor 3 actually detects the action, the user's action can hardly be detected when the predetermined time is excessively short, the false detection or security problem is generated when the predetermined time is excessively long. Therefore, the predetermined time is properly set to the optimum time.

After the receiver 11 receives the function enabling signal, namely, after the sensor 3 is started, the opening and closing body controller 13 controls the opening operation of the opening and closing body 2 based on the action that is detected by the sensor 3 before the determination unit 15 determines that the predetermined time elapses. That is, the opening and closing body controller 13 controls the opening operation of the opening and closing body 2 based on the action that is detected within the predetermined time by the sensor 3 after the function enabling signal is received.

The false detection caused by the unnecessary action can thus be prevented by restricting the detection of the action to the predetermined time. The gesture detection function is enabled even from a place distant from the vehicle 1 using the portable machine 20, so that the detection of the action can be enabled when the desired passenger gets in the vehicle 1.

It is not necessary that the sensor 3 always detect the action, so that power saving can be achieved on the vehicle side.

The opening and closing body controller 13 may control the opening operation only of the opening and closing body 2 in which the sensor 3 having detected the user's action is provided or the opening and closing body 2 around the sensor 3. Thus, the high safety can be ensured by restricting the opening and closing body in which the opening operation is performed. The sensor 3 is provided in each opening and closing body 2 or each of both the lateral surfaces and the rear side of the vehicle 1. In the case that the sensor 3 is provided in each opening and closing body 2, the opening and closing body controller 13 may perform the opening operation only of the opening and closing body 2 in which the sensor 3 having detected the user's action is provided. In the case that the sensor 3 is provided in each of both the lateral surfaces and the rear side of the vehicle 1, the opening and closing body controller 13 may perform the opening operation only of the opening and closing body 2 on the side on which the sensor 3 having detected the user's action is provided. Preferably the opening and closing body controller 13 of the control device 10 performs the opening operation after unlocking in the case that the opening and closing body controller 13 controls the opening operation while the opening and closing body 2 is locked. Therefore, even if the opening and closing body 2 is locked, the opening operation of the opening and closing body 2 can be performed by one manipulation, and the convenience is improved.

The controller 14 also includes an authentication unit 16 that authenticates the portable machine 20. Preferably the authentication unit 16 authenticates the portable machine 20 when the sensor 3 detects the action. In this case, the portable machine 20 includes the portable machine receiver 23 that receives an authentication request signal from the transmitter 12 of the vehicle 1. The authentication unit 16 also authenticates the portable machine 20 when receiving the function enabling signal from the portable machine 20, and the sensor 3 is started only when the authentication unit 16 successfully authenticates the portable machine 20. The controller 14 may directly perform the opening operation of the opening and closing body 2 when the sensor 3 detects the user's action. However, because there is a certain level of time difference until the sensor 3 detects the user's action since the function enabling signal is received, preferably the portable machine 20 is authenticated again when the sensor 3 detects the user's action. The authentication unit 16 may authenticate the portable machine 20 at another time.

When the controller 14 recognizes that the sensor 3 detects the user's action, the transmitter 12 of the control device 10 transmits the authentication request signal making a authentication request to the portable machine 20 under the control of the controller 14. When the portable machine receiver 23 receives the authentication request signal, the portable machine transmitter 22 sends back an authentication response signal including previously-set authentication code of the portable machine 20 to the receiver 11 of the vehicle 1. The receiver 11 transmits the received authentication code to the authentication unit 16. The authentication unit 16 determines whether the received authentication code is normal. When the received authentication code is normal, the controller 14 issues an instruction to the opening and closing body controller 13 to perform the opening operation. Therefore, the authentication is performed to the detection of the action that becomes the condition of the opening operation, so that the high security can be ensured.

A method for controlling the control device 10 will be described with reference to FIG. 2. S in the flowchart means a step. As illustrated in FIG. 2, the portable machine 20 of the first embodiment includes a gesture entry permission switch that enables the action detection function as the manipulation unit 21.

In S100, the user manipulates the gesture entry permission switch of the portable machine 20. In S102, the receiver 11 of the control device 10 on the side of the vehicle 1 checks whether the function enabling signal is received. When the manipulation unit 21 of the gesture entry permission switch is manipulated, the portable machine 20 transmits the function enabling signal from the portable machine transmitter 22.

When the receiver 11 receives the function enabling signal, the controller 14 starts the sensor 3 such that the sensor 3 can detect the user's action in S104. In S106, at the same time as the controller 14 starts the sensor 3, the determination unit 15 sets the predetermined time for which the sensor 3 detects the user's action when the receiver 11 receives the function enabling signal. In S118, the determination unit 15 measures the predetermined time since the receiver 11 receives the function enabling signal, and the determination unit 15 determines whether the predetermined time elapses. When the receiver 11 does not receive the function enabling signal in S102, nothing is performed to terminate the processing.

During the predetermined time, the controller 14 continuously checks whether the sensor 3 detects the user's action in S108. When the sensor 3 detects the user's action, the transmitter 12 transmits the authentication request signal to the portable machine 20 in S110. Because the portable machine 20 that receives the authentication request signal sends back the authentication response signal including the set authentication code, the authentication unit 16 checks whether the sent-back authentication code is normal, namely, whether the portable machine 20 is successfully authenticated in S112.

When the authentication unit 16 checks that the sent-back authentication code is not normal, the controller 14 returns from S118 to S108 to continuously checks whether the sensor 3 detects the user's action again until the predetermined time elapses. When the authentication code is normal to successfully perform the authentication, the opening and closing body controller 13 performs the opening operation of the opening and closing body 2 in S114. After the opening operation of the opening and closing body 2, the controller 14 stops the sensor 3 in S116 in order to prevent the malfunction. When the predetermined time elapses while the sensor 3 does not detects the user's action, the sensor 3 is also stopped. In this case, the controller 14 may stop the detection function of the sensor 3, or the controller 14 may ignore the detection result of the sensor 3 although the sensor 3 detects the user's action. In this case, preferably energization of the sensor 3 is stopped because the power saving is achieved on the vehicle side.

A display method in the display 24 of the portable machine 20 will be described with reference to FIG. 3. When the user manipulates the gesture entry permission switch that is of the manipulation unit 21 of the portable machine 20 in S200, the portable machine 20 transmits the function enabling signal from the portable machine transmitter 22. In S202, the portable machine 20 checks whether the set predetermined time elapses. When the predetermined time does not elapse yet, the display 24 of the portable machine 20 displays the remaining time in which the elapsed time since the portable machine transmitter 22 transmits the function enabling signal is subtracted from the set predetermined time in S206. The display 24 continuously performs the display until the remaining time becomes zero, and the display 24 terminates the display in S204 when the remaining time becomes zero.

In the vehicle 1, when the sensor 3 detects the user's action (YES in S108 of FIG. 2), and when the portable machine 20 successfully performs the authentication (YES in S112 of FIG. 2), namely, when the opening operation of the opening and closing body 2 is performed in S114, the display 24 may terminate the display of the remaining time. Therefore, the user can recognize that the opening operation of the opening and closing body 2 is performed.

The portable machine 20 includes the portable machine receiver 23 that receives a function enabling notification signal from the control device 10. The function enabling notification signal starts the sensor 3 in the vehicle 1 using the function enabling signal transmitted by the portable machine 20, and notifies the portable machine 20 that the gesture detection function is enabled. The display 24 may display the remaining time after the function enabling notification signal is received. It is conceivable that sometimes the side of the vehicle 1 does not receive the function enabling signal even if the portable machine 20 transmits the function enabling signal. Therefore, a false impression given to the user due to the display of the remaining time can be avoided in such cases.

In the case that the portable machine 20 does not receive the function enabling notification signal within the predetermined time after transmitting the function enabling signal, the display 24 may display a message that the function is not enabled in the vehicle 1. In the case that the side of the vehicle 1 does not receive the function enabling signal even if the portable machine 20 transmits the function enabling signal, the user can be notified that the side of the vehicle 1 does not receive the function enabling signal by displaying the message. When the remaining time is not zero, namely, when the gesture entry can be performed, a message that the sensor 3 is enabled may be displayed on the vehicle side.

The owner of the portable machine enables the gesture entry function only for the predetermined time by owner's choice, so that the false detection of the action can be prevented during the disabled function to cut power consumption of the vehicle. Because the portable machine displays the remaining time of the predetermined time for which the gesture entry function is enabled, the owner can easily understand whether the gesture entry function is enabled, the owner or the desired passenger can surely perform the action within the predetermined time, and the convenience of the gesture entry function can be improved.

Figure 4C:
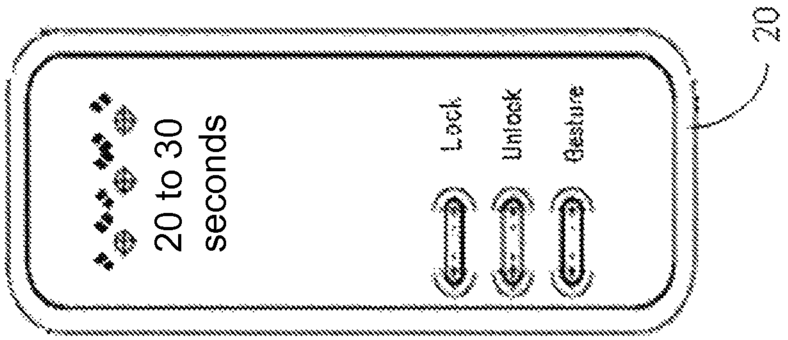
FIGS. 4A, 4B, and 4C are explanatory views illustrating a display method in the portable machine of the first embodiment.
Figure 4B:
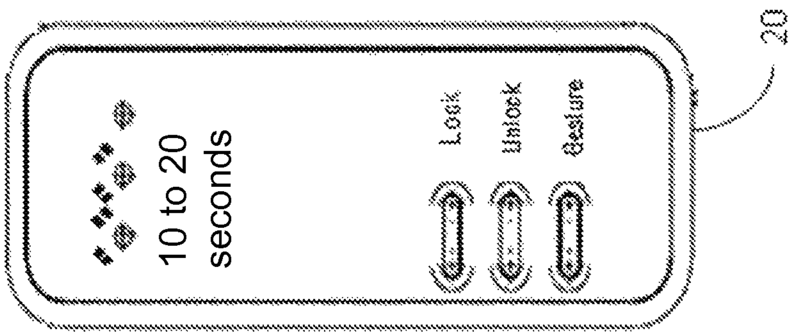
Figure 4A:
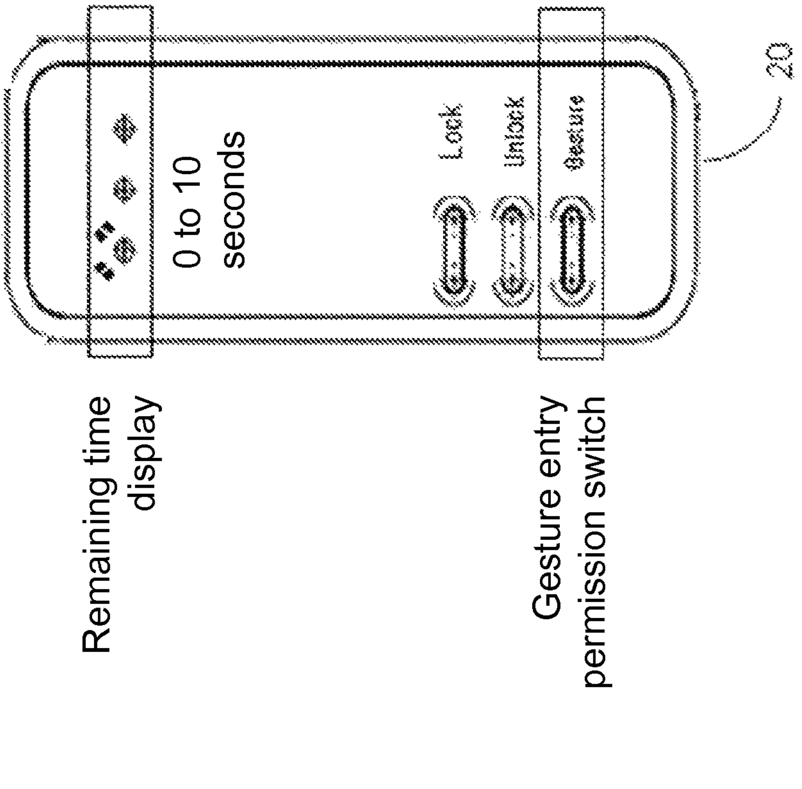

An example of a method for displaying the remaining time in the portable machine 20 will be described below. FIG. 4 illustrates the portable machine 20 including the display provided with three LEDs. In the portable machine 20 of FIG. 4, the remaining time is greater than or equal to 20 seconds and less than 30 second in the case that all the three LEDS are lit (FIG. 4C), and the remaining time is greater than or equal to 10 seconds and less than 20 second in the case that the two LED on the left-most and center sides are lit (FIG. 4B). In the portable machine 20, the remaining time is less than 10 seconds in the case that the LED on the left-most side is lit, and the LED on the left-most side may blink in the case that the remaining time is less than or equal to 5 seconds. The portable machine 20 displays the remaining time by changing a pattern or the number of lighting or blinking LEDs.

The above display method is described only by way of example, and the remaining time may be displayed by a numeric character using 7-segment display as illustrated in a portable machine 20' of FIG. 5. The remaining time can more finely be displayed when the remaining time is counted down using the display of the numeric character.

Figures 5A, 5B, 5C:
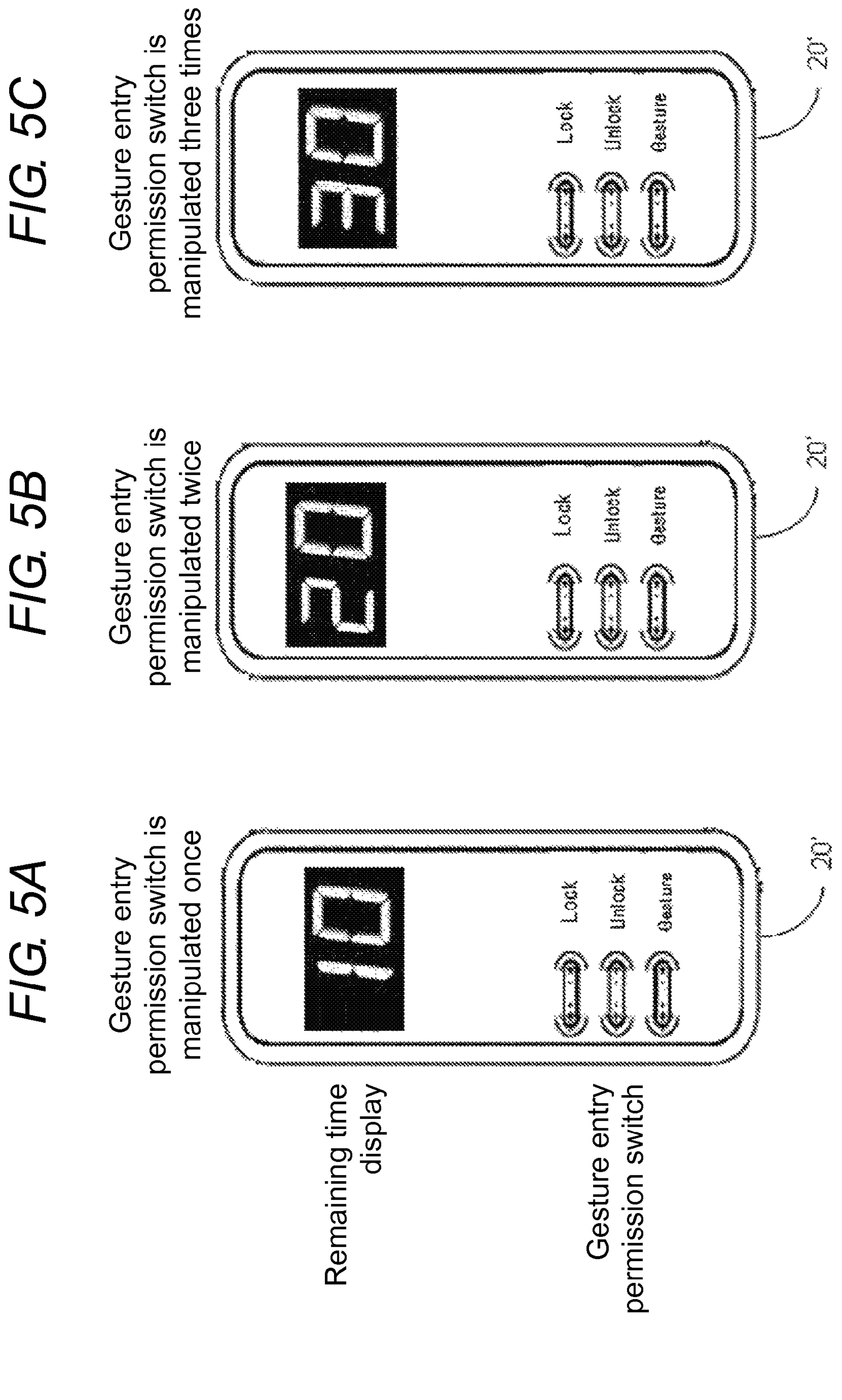
FIGS. 5A, 5B, and 5C are explanatory views illustrating a display method in a portable machine according to a portable machine (a modification) of the first embodiment.

A method for setting the predetermined time for which the sensor 3 is enabled will be described with reference to FIGS. 5 and 6. The portable machine 20 sets the predetermined time to 10 seconds (FIG. 5A) when the user manipulates the gesture entry permission switch (gesture) that is of the manipulation unit 21 once, the portable machine 20 sets the predetermined time to 20 seconds (FIG. 5B) when the user manipulates the gesture entry permission switch twice, the portable machine 20 sets the predetermined time to 30 seconds (FIG. 5C) when the user manipulates the gesture entry permission switch three times, and the portable machine 20 transmits function enabling signal at the same time. The setting may be performed after the user presses the gesture entry permission switch long to put the manipulation unit 21 into a setting mode.

Figure 6:
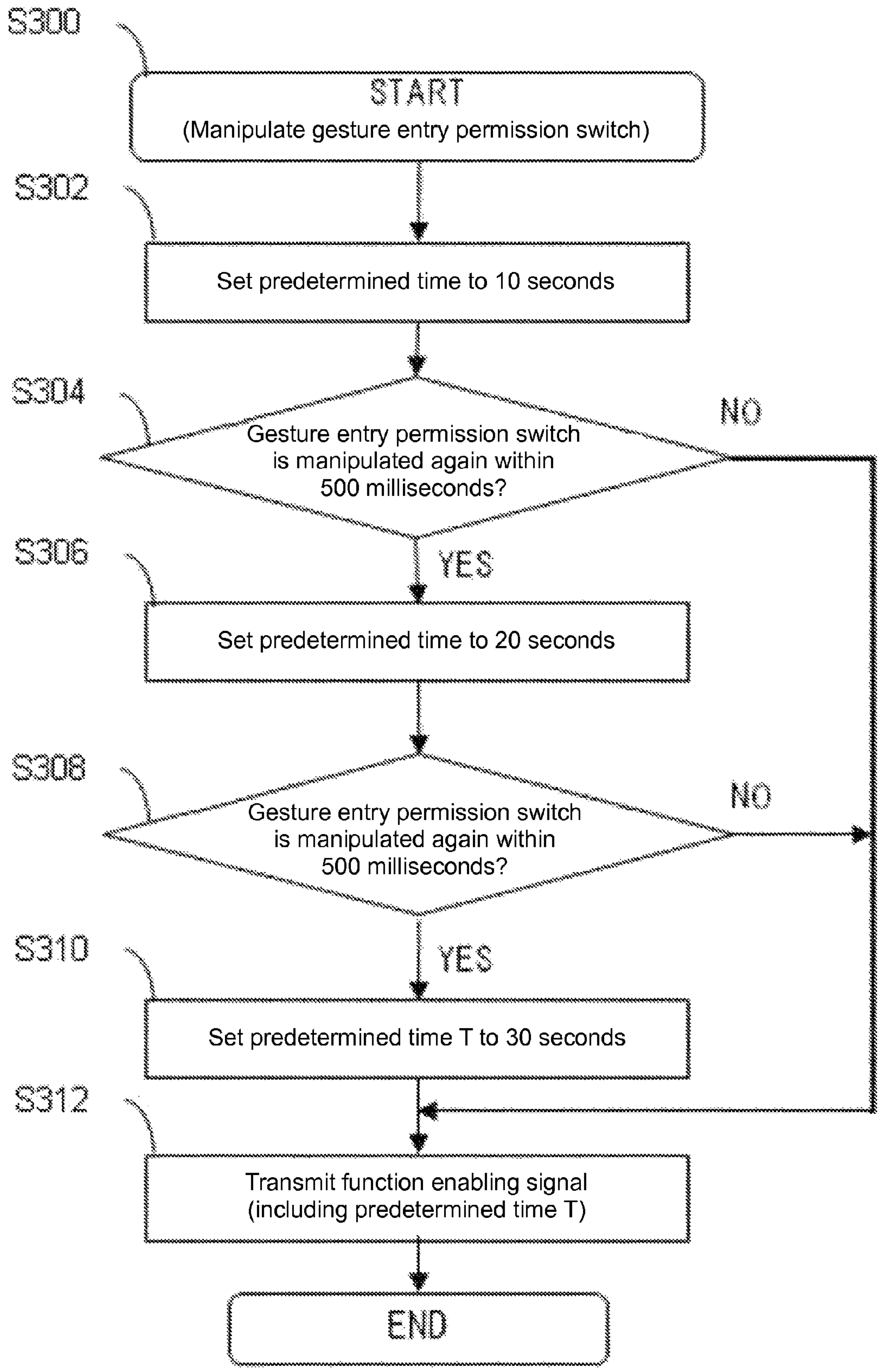
FIG. 6 is a flowchart illustrating a predetermined time setting step in the portable machine of the first embodiment.

FIG. 6 illustrates the processing of the portable machine 20'. In S300, the processing is started when the user manipulates the gesture entry permission switch of the portable machine 20'. In S302, the portable machine 20' temporarily sets the predetermined time to 10 seconds, and displays 10 seconds on the display. In S304, the manipulation unit checks whether the user manipulates the gesture entry permission switch again within 500 milliseconds. When the user does not manipulate the gesture entry permission switch again within 500 milliseconds, the portable machine 20' sets the predetermined time to 10 seconds to transmit the predetermined time and the function enabling signal onto the side of the vehicle 1 in S312.

When the user manipulates the gesture entry permission switch again within 500 milliseconds, the portable machine 20' temporarily sets the predetermined time to 20 seconds and displays 20 seconds on the display in S306 because the manipulation is performed twice in total. In S308, the manipulation unit checks whether the user manipulates the gesture entry permission switch again within 500 milliseconds. When the user does not manipulate the gesture entry permission switch again within 500 milliseconds, the portable machine 20' sets the predetermined time to 20 seconds to transmit the predetermined time and the function enabling signal onto the side of the vehicle 1 in S312.

When the user manipulates the gesture entry permission switch again within 500 milliseconds, the portable machine 20' temporarily sets the predetermined time to 30 seconds and displays 30 seconds on the display in S310 because the manipulation is performed third times in total. In S312, the portable machine 20' transmits the predetermined time and the function enabling signal onto the side of the vehicle 1. Because the predetermined time is variable, various predetermined times can be set according to the situation, and the user-friendliness is improved.

In the first embodiment, the predetermined time can be set only to 10 seconds, 20 seconds, and 30 seconds. However, preferably the predetermined time is freely set by the similar manipulation of the user. Therefore, the user-friendliness is further improved.

Second Embodiment

Figure 7:
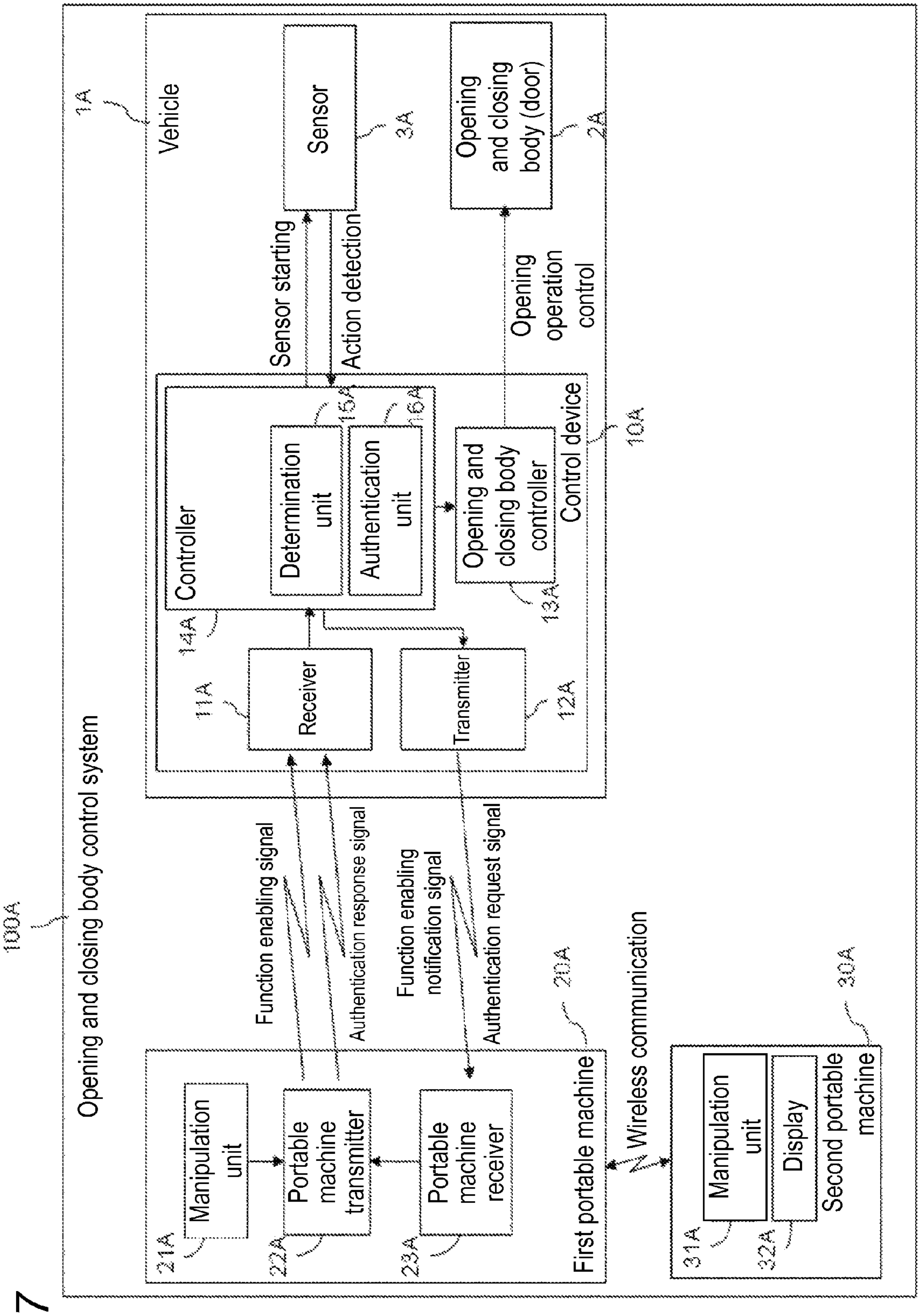
FIG. 7 is a block diagram illustrating an opening and closing body control system according to a second embodiment of the disclosure.

A portable machine according to a second embodiment will be described with reference to FIG. 7. A point different from the first embodiment will mainly be described to avoid the overlapping description. The portable machine of the second embodiment is provided with a first portable machine 20A and a second portable machine 30A. Similarly to the portable machine of the first embodiment, the first portable machine 20A conducts wireless communication with a control device 10A of a vehicle 1A to transmit the function enabling signal.

The first portable machine 20A needs not to include the display.

The first portable machine 20A also conducts the wireless communication with the second portable machine 30A. There is no particular limitation to the wireless communication method, but Bluetooth (registered trademark) or NFC (Near Field Communication) may be used because the wireless communication is conducted at a relatively close range. The second portable machine 30A has a function of being able to conduct wireless communication with the first portable machine 20A, and includes a manipulation unit 31A and a display 32A. Typically the second portable machine 30A is a smartphone, and the manipulation unit 31A and the display 32A are implemented by an application through a liquid crystal panel that can perform variable display and contact manipulation.

In the case that the user manipulates the manipulation unit 31A of the second portable machine 30A to transmit the function enabling signal, the second portable machine 30A transmits the information indicating that the function enabling signal is wirelessly transmitted to the first portable machine 20A by the manipulation of the manipulation unit 31A. The first portable machine 20A that receives the information indicating that the function enabling signal is transmitted actually transmits the function enabling signal to the vehicle 1A. In the second portable machine 30A, the manipulation unit 31A is manipulated, the remaining time of the set predetermined time is displayed on the display 32A. A presentation having a rich expressive power can be performed by displaying the remaining time in the smartphone (second portable machine) having an extensive display function. In the function of the manipulation unit 31A, excellent operability can be implemented by an application on the smartphone.

Figure 8A:
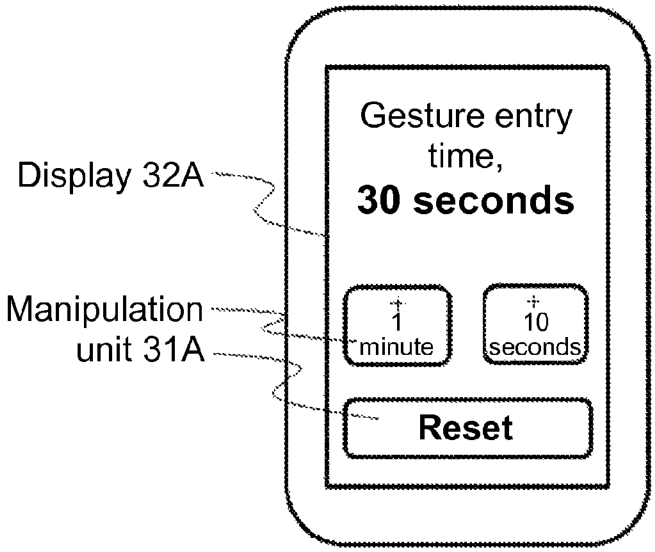
FIG. 8A is an explanatory view illustrating a setting screen of a gesture entry system in a portable machine of the second embodiment.

A method for setting an enabled time of the gesture entry function in the second portable machine 30A that is of the smartphone will be described with reference to FIG. 8A. As illustrated in FIG. 8A, in the case that the enabled time of the gesture entry function is set, the use of the second portable machine 30A that is of the smartphone enables the user to easily set the display. On the display 32A, that the enabled time of the gesture entry function is 30 second is displayed by characters, and a button extending the enabled time by 1 minute, a button extending the enabled time by 10 seconds, and a reset button are displayed. These buttons are functional buttons that can be manipulated by a finger. The user can extend a standard setting time of 30 seconds by manipulating the buttons. The enabled time can be shortened when the user manipulates a button shortening the enabled time to by 10 seconds.

Figure 8B:
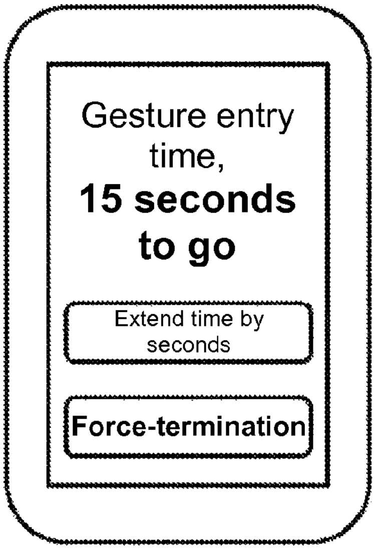
FIG. 8B is an explanatory view illustrating a display screen of gesture entry remaining time.

FIG. 8B illustrates a display screen for a gesture entry remaining time. On the display screen, that the remaining time is 15 seconds is displayed, and a button extending the remaining time by 10 seconds and a force-termination button are displayed. Sometimes the user extends the remaining time when the remaining time is several seconds after the gesture entry function is enabled, or sometimes the user forcedly terminates the gesture entry function in a moment while the enabled time remains. In such cases, the remaining time can be extended by 10 seconds when the user manipulates the button extending the remaining time by 10 seconds, and the gesture entry function can immediately be terminated when the user manipulates the force-termination button.

In the case that the user manipulates the manipulation unit 21A of the first portable machine 20A to transmit the function enabling signal, the remaining time can also be displayed on the display 32A of the second portable machine 30A. In this case, when the function enabling signal is transmitted from the first portable machine 20A to the vehicle, the first portable machine 20A also transmits information indicating that the function enabling signal is transmitted to the second portable machine 30A, and the second portable machine 30A that receives the information may automatically display the remaining time on the display 32A. In the case that the user manipulates the manipulation unit 31A of the second portable machine 30A to display the remaining time, the second portable machine 30A makes a request of the information on the remaining time to the first portable machine 20A, and the obtained information may be displayed.

The disclosure is not limited to the above embodiments, various modifications can be made without departing from the scope of the claims. That is, although the invention is particularly illustrated and described by the specific embodiment, those skilled in the art can make various changes and modifications in the numerical quantity and other detailed configurations of the above embodiments without departing from the technical thought and scope of the invention.

The invention claimed is:

1. A portable machine comprising:

a manipulation unit that receives a manipulation for opening and closing of an opening and closing body of a vehicle;

a transmitter that directly transmits a function enabling signal to a control device of the vehicle based on the manipulation of the manipulation unit, wherein the control device controls the opening and closing; and a display that displays information, wherein the display displays a remaining time of a predetermined time after the transmitter transmits the function enabling signal, and wherein the control device controls an opening operation of the opening and closing body based on user's action detected by a sensor within the predetermined time after the function enabling signal is received, the sensor being provided in or around the opening and closing body to detect the user's action.

2. The portable machine according to claim 1, further comprising a receiver configured to receive a function enabling notification signal from the control device, the function enabling notification signal making a notification that a function is enabled by the function enabling signal, wherein the display displays the remaining time after the function enabling notification signal is received.

3. The portable machine according to claim 2, wherein the display displays a message that the function is not enabled when the function enabling notification signal is not received within the predetermined time after the function enabling signal is transmitted.

4. The portable machine according to claim 1, wherein the portable machine is provided with a plurality of portable machines comprising a first portable machine configured to transmit the function enabling signal and a second portable machine including a display configured to display the remaining time.

5. The portable machine according to claim 1, wherein the predetermined time is variable.

6. An opening and closing body control system comprising:

an opening and closing body of a vehicle;

a control device of the vehicle that controls opening and closing of the opening and closing body;

a portable machine that directly transmits a function enabling signal to the control device based on a manipulation; and a sensor provided in or around the opening and closing body that detects user's action, wherein the portable machine displays a remaining time of a predetermined time after the function enabling signal is transmitted, and wherein the control device controls an opening operation of the opening and closing body based on user's action detected by the sensor within the predetermined time after the function enabling signal is received.

7. The opening and closing control system according to claim 6, wherein the control device performs the opening operation after unlocking, when the control device controls the opening operation while the opening and closing body is locked.

8. The portable machine according to claim 1, wherein the manipulation unit is a gesture entry permission switch displayed on the display, that triggers the transmitter to send the function enabling signal to the control device.

9. The open and closing control system according to claim 6, wherein the portable machine comprises a gesture entry permission switch displayed on the display, that triggers the portable machine to send the function enabling signal to the control device.

* * * * *